(12) United States Patent
Zheng et al.

(10) Patent No.: US 11,092,772 B2
(45) Date of Patent: Aug. 17, 2021

(54) OPTICAL MODULE AND HEAD-MOUNTED DISPLAY APPARATUS

(71) Applicant: SHENZHEN KUKU TECHNOLOGY CO., LTD., Guangdong (CN)

(72) Inventors: Xiaolin Zheng, Guangdong (CN); Jun Liu, Guangdong (CN); Hao Chen, Guangdong (CN)

(73) Assignee: SHENZHEN KUKU TECHNOLOGY CO., LTD., Shenzhen (CN)

( * ) Notice: Subject to any disclaimer, the term of this patent is extended or adjusted under 35 U.S.C. 154(b) by 296 days.

(21) Appl. No.: 16/254,556

(22) Filed: Jan. 22, 2019

(65) Prior Publication Data

US 2019/0154952 A1    May 23, 2019

Related U.S. Application Data (63) Continuation of application No. PCT/CN2016/107240, filed on Nov. 25, 2016.

(30) Foreign Application Priority Data

Aug. 3, 2016    (CN) .......................... 201610628648.2

(51) Int. Cl.
G02B 7/04      (2021.01)
G02B 27/01     (2006.01)
G02B 7/02      (2021.01)

(52) U.S. Cl.
CPC .............. G02B 7/04 (2013.01); G02B 7/021 (2013.01); G02B 7/023 (2013.01); G02B 27/0176 (2013.01); G02B 2027/0154 (2013.01)

(58) Field of Classification Search
CPC .................................................... H05K 5/0217
(Continued)

(56) References Cited

U.S. PATENT DOCUMENTS

2016/0349519 A1* 12/2016 Yang .................. G02B 27/0179
2019/0159354 A1*  5/2019 Zheng ...................... A42B 1/24

FOREIGN PATENT DOCUMENTS

CN        2819243 Y        9/2006
CN      204679715 U        9/2015
(Continued)

OTHER PUBLICATIONS

International Search Report of PCT Patent Application No. PCT/CN2016/107240 dated Apr. 27, 2017.

*Primary Examiner* — Kristina M Deherrera (57) ABSTRACT

The invention discloses an optical module and a head-mounted display apparatus. The optical module includes a left/right lens barrel mechanism, a left/right sight distance adjusting mechanism, and a left/right pupillary distance adjusting mechanism; The left lens barrel mechanism includes a left lens barrel assembly and a left display screen disposed behind the left lens barrel assembly through a left screen bracket; The left sight distance adjusting mechanism adjusts the distance between the left display screen and the left lens barrel assembly; The left pupillary distance adjusting mechanism drives the left lens barrel mechanism to move left and right. Symmetrically, the structure of the right side is the same as left. The optical module adjusts the sight distance/pupillary distance of left and right eye separately by the left and right sight distance adjusting mechanism/pupillary distance adjusting mechanism, so that images seen by both eyes are clearer.

8 Claims, 4 Drawing Sheets

(58) Field of Classification Search
USPC .......................................................... 359/480
See application file for complete search history.

(56) References Cited

FOREIGN PATENT DOCUMENTS

| | | | |
|---|---|---|---|
| CN | 104977718 | A | 10/2015 |
| CN | 204832684 | U | 12/2015 |
| CN | 204903862 | U | 12/2015 |
| CN | 205003374 | U | 1/2016 |
| CN | 105659146 | A | 6/2016 |
| KR | 101635892 | B1 | 7/2016 |
| WO | 2015168191 | A1 | 11/2015 |

* cited by examiner

OPTICAL MODULE AND HEAD-MOUNTED DISPLAY APPARATUS

CROSS REFERENCE TO RELATED APPLICATIONS

The present application is a Continuation Application of PCT Application No. PCT/CN2016/107240 filed on Nov. 25, 2016, which claims the benefit of Chinese Patent Application No. 201610628648.2 filed on Aug. 3, 2016. All the above are hereby incorporated by reference.

TECHNICAL FIELD

The invention relates to the field of display apparatus, in particular to the optical module and head-mounted display apparatus.

BACKGROUND ART

With the development of science and technology and the increasing demand for multimedia video, the commonly used multimedia playing devices need to be used with an external LED or LCD display screen. As the pixel and size of the image displayed on the external display screen are limited by the size of the display, and the visual effect cannot meet people's demand, the head-mounted display came into being. Head-Mounted Display (HMD) is an optical product for stereoscopic display, which transmits signals having three-dimensional effects of binocular parallax through display element and optical lenses disposed in front of both eyes to eyes in order, generating stereoscopic and large-sized images. The head-mounted display apparatus is usually applied to an augmented reality (AR) system or a virtual reality (VR) system, it can move with the user and receive the user's reaction as an input device, and through the head-mounted display device worn on the user's head, images and files are added to the images viewed by the user, thereby achieving the effect of augmented reality or virtual reality.

The existing head-mounted display apparatus comprises a display module for displaying optical images and a headband module connected with the display module to be worn on a user's head, wherein the display module is provided with an optical module. The existing optical module comprises a display screen, a left lens barrel assembly and a right lens barrel assembly arranged in front of the display screen, a sight distance adjusting assembly for adjusting the sight distance and a pupillary distance adjusting mechanism for adjusting the pupillary distance. The existing sight distance adjusting assembly realizes sight distance adjustment by synchronously moving the left lens barrel assembly and the right lens barrel assembly back and forth; the pupillary distance adjusting mechanism realizes pupillary distance adjustment by synchronously moving left lens barrel assembly and the right lens barrel assembly. The existing sight distance adjusting assembly can only synchronously adjust the sight distance of the left lens barrel assembly and the right lens barrel assembly, for users with different diopters of left eye and right eye, synchronously adjusting the sight distance of the left lens barrel assembly and the right lens barrel assembly will cause the sharpness of image viewed by the left eye and right eye to be different when user views the images through the optical module, affecting the visual experience. In addition, the existing pupillary distance adjusting mechanism makes the left lens barrel assembly and the right lens barrel assembly move relative to the effective display screen of the display screen in the pupil distance adjusting process. As a result, the optical centers of the left lens barrel assembly and the right lens barrel assembly change with respect to the display center of the display screen, affecting the display effect of the images displayed by the left lens barrel assembly and the right lens barrel assembly. Moreover, the existing pupillary distance adjusting mechanism can only synchronously adjust the distance between the left lens barrel assembly and the right lens barrel assembly, and cannot separately adjust the positions of the left lens barrel assembly and the right lens barrel assembly according to the pupillary distance of the wearer's eyes.

SUMMARY OF PRESENT INVENTION

The technical problem to be solved by the present invention is to provide an optical module and a head-mounted display apparatus aiming at the defect that the sight distance adjusting mechanism and the pupillary distance adjusting mechanism in the existing optical module can only synchronously adjust the left lens barrel assembly and the right lens barrel assembly, and the impact of effects brought by the pupillary distance adjusting mechanism when adjusting pupillary distance.

The technical solution adopted by the invention to solve the technical problem is: the invention provides an optical module, comprising a module housing, and a left lens barrel mechanism, a right lens barrel mechanism, a left sight distance adjusting mechanism, a right sight distance adjusting mechanism, a left pupillary distance adjusting mechanism and a right pupillary distance adjusting mechanism arranged in the module housing; The left lens barrel mechanism comprises a left lens barrel assembly and a left display screen assembly sleeved behind the left lens barrel assembly, the left display screen assembly includes a left display screen and a left screen bracket for mounting the left display screen; The right lens barrel mechanism comprises a right lens barrel assembly and a right display screen assembly sleeved behind the right lens barrel assembly; the right display screen assembly includes a right display screen and a right screen bracket for mounting the right display screen; The left sight distance adjusting mechanism is arranged inside the module housing and connected with the left display screen assembly, for adjusting the distance between the left display screen and the left lens barrel assembly; the right sight distance adjusting mechanism is arranged inside the module housing and connected with the right display screen assembly, for adjusting the distance between the right display screen and the right lens barrel assembly; The left pupillary distance adjusting mechanism is connected with the left lens barrel mechanism and used for driving the left lens barrel mechanism to move left and right; the right pupillary distance adjusting mechanism is connected with the right lens barrel mechanism and used for driving the right lens barrel mechanism to move left and right.

Preferably, the left sight distance adjusting mechanism comprises a left adjustment button, a left driven synchronous gear, a first left synchronous screw, a second left synchronous screw, a third left synchronous screw, a left tension wheel, a left synchronous belt and a left sight distance pushing bracket; The left sight distance pushing bracket is connected with the left screen bracket; the left sight distance pushing bracket is arranged on the first left synchronous screw, second left synchronous screw and third left synchronous screw. The left adjustment button, left driven synchronous gear, first left synchronous screw, second left synchronous screw, third left synchronous screw and left tension wheel are matched with left synchronous belt, so that the left sight distance pushing bracket drives the left screen bracket to move back and forth;

The right sight distance adjusting mechanism comprises a right adjustment button, a right driven synchronous gear, a first right synchronous screw, a second right synchronous screw, a third right synchronous screw, a right tension wheel, a right synchronous belt and a right sight distance pushing bracket; The right sight distance pushing bracket is connected with the right screen bracket; the right sight distance pushing bracket is arranged on the first right synchronous screw, second right synchronous screw and third right synchronous screw. The right adjustment button, right driven synchronous gear, first right synchronous screw, second right synchronous screw, third right synchronous screw and right tension wheel are matched with right synchronous belt, so that the right sight distance pushing bracket drives the right screen bracket to move back and forth.

Preferably, the left adjustment button comprises a left rotation control part and a left driving gear part which are integrally formed; The first left synchronous screw comprises a first left driven gear part and a first left screw part which are integrally formed; The second left synchronous screw comprises a second left driven gear part and a second left screw part which are integrally formed; The third left synchronous screw comprises a third left driven gear part and a third left screw part which are integrally formed; The left sight distance pushing bracket comprises a left bracket body, and a first left screw hole, a second left screw hole, a third left screw hole and a left bracket connecting part arranged on the left bracket body; The left driving gear part, left tension wheel, left driven synchronous gear, first left driven gear part, second left driven gear part and third left driven gear part are matched with the left synchronous belt to realize synchronous transmission; The first left screw part matches with the first left screw hole, the second left screw part matches with the second left screw hole, and the third left screw part matches with the third left screw hole, so as to move the left bracket body back and forth;

The right adjustment button comprises a right rotation control part and a right driving gear part which are integrally formed; The first right synchronous screw comprises a first right driven gear part and a first right screw part which are integrally formed; The second right synchronous screw comprises a second right driven gear part and a second right screw part which are integrally formed; The third right synchronous screw comprises a third right driven gear part and a third right screw part which are integrally formed; The right sight distance pushing bracket comprises a right bracket body, and a first right screw hole, a second right screw hole, a third right screw hole and a right bracket connecting part arranged on the right bracket body; The right driving gear part, right tension wheel, right driven synchronous gear, first right driven gear part, second right driven gear part and third right driven gear part are matched with the right synchronous belt to realize synchronous transmission; The first right screw part matches with the first right screw hole, the second right screw part matches with the second right screw hole, and the third right screw part matches with the third right screw hole, so as to move the right bracket body back and forth.

Preferably, the left sight distance pushing bracket comprises two left bracket connecting parts arranged opposite to each other from top to bottom, and each left bracket connecting part is provided with left plastic bones extending inward; the left screen bracket is provided with two left structural grooves matched with the left plastic bones oppositely in the vertical direction;

The right sight distance pushing bracket comprises two right bracket connecting parts arranged opposite to each other from top to bottom, and each right bracket connecting part is provided with right plastic bones extending inward; the right screen bracket is provided with two right structural grooves matched with the right plastic bones oppositely in the vertical direction.

Preferably, the module housing comprises a module front housing and a module rear housing, the module front housing is provided with a plurality of metal mounting shafts; The left adjustment button, left driven synchronous gear, first left synchronous screw, second left synchronous screw, third left synchronous screw, left tension wheel, left synchronous belt and left sight distance pushing bracket are arranged on the metal mounting shafts; The right adjustment button, right driven synchronous gear, first right synchronous screw, second right synchronous screw, third right synchronous screw, right tension wheel, right synchronous belt and right sight distance pushing bracket are arranged on the metal mounting shafts.

Preferably, the left lens barrel assembly comprises a left lens barrel housing and a left lens assembly disposed in the left lens barrel housing, the left lens barrel housing is provided with at least one left connecting hole; The left screen bracket is provided with at least one left sliding limit groove arranged along the front-back direction; The left lens barrel mechanism further includes a left connecting pin that passes through the left sliding limit groove and is installed on the left connecting hole;

The right lens barrel assembly comprises a right lens barrel housing and a right lens assembly disposed in the right lens barrel housing, the right lens barrel housing is provided with at least one right connecting hole; The right screen bracket is provided with at least one right sliding limit groove arranged along the front-back direction; The right lens barrel mechanism further includes a right connecting pin that passes through the right sliding limit groove and is installed on the right connecting hole.

Preferably, the left pupillary distance adjusting mechanism comprises a left pupillary distance guide shaft, a left lens barrel connecting piece, a left pushing piece and a left push button; The left pupillary distance guide shaft is installed on the module housing; The left lens barrel connecting piece is disposed on the left pupillary distance guide shaft and is connected with the left lens barrel assembly; The left pushing piece is disposed on the left pupillary distance guide shaft and drives the left lens barrel connecting piece to move along the left pupillary distance guide shaft; The left push button is disposed on the left pushing piece and used for controlling the left pushing piece to move along the left pupillary distance guide shaft;

The right pupillary distance adjusting mechanism comprises a right pupillary distance guide shaft, a right lens barrel connecting piece, a right pushing piece and a right push button; The right pupillary distance guide shaft is installed on the module housing; The right lens barrel connecting piece is disposed on the right pupillary distance guide shaft and is connected with the right lens barrel assembly; The right pushing piece is disposed on the right pupillary distance guide shaft and drives the right lens barrel connecting piece to move along the right pupillary distance guide shaft; The right push button is disposed on the right pushing piece and used for controlling the right pushing piece to move along the right pupillary distance guide shaft.

Preferably, the left lens barrel connecting piece comprises a left lens barrel connecting part and a left guide shaft connecting part which are integrally formed, the left lens barrel connecting part is provided with a left guide through hole for the left lens barrel assembly to pass through, the left guide shaft connecting part is provided with a left guide through hole for the left pupillary distance guide shaft to pass through; The left push button comprises a left pushing part and a left extension convex part which are integrally formed; The left pushing piece is provided with a left slot matched with the left extension convex part and a left pushing insertion hole for the left pupillary distance guide shaft to pass through;

The right lens barrel connecting piece comprises a right lens barrel connecting part and a right guide shaft connecting part which are integrally formed, the right lens barrel connecting part is provided with a right guide through hole for the right lens barrel assembly to pass through, the right guide shaft connecting part is provided with a right guide through hole for the right pupillary distance guide shaft to pass through; The right push button comprises a right pushing part and a right extension convex part which are integrally formed; The right pushing piece is provided with a right slot matched with the right extension convex part and a right pushing insertion hole for the right pupillary distance guide shaft to pass through.

Preferably, the left pupillary distance adjusting mechanism further comprises a left push limiting assembly; The left push limiting assembly comprises a left pupillary distance sliding limiting piece disposed inside the module housing, the left pupillary distance sliding limiting piece and the module housing match to form a left sliding space for the left pushing piece to be inserted; The left pupillary distance sliding limiting piece inside the sliding space or one side of the module housing is provided with a left sliding gear rack; the part of the left sliding space where the left pushing piece inserted is provided with a left pushing gear matched with the left sliding gear rack;

The right pupillary distance adjusting mechanism further comprises a right push limiting assembly; The right push limiting assembly comprises a right pupillary distance sliding limiting piece disposed inside the module housing, the right pupillary distance sliding limiting piece and the module housing match to form a right sliding space for the right pushing piece to be inserted; The right pupillary distance sliding limiting piece inside the sliding space or one side of the module housing is provided with a right sliding gear rack; the part of the right sliding space where the right pushing piece inserted is provided with a right pushing gear matched with the right sliding gear rack.

The invention further provides a head-mounted display apparatus comprising the optical module and a headband module connected to the optical module.

Compared with prior art, the present invention has the following advantages: the optical module and the head-mounted display apparatus including the optical module and the headband assembly provided in this embodiment, the left lens barrel mechanism comprises a left lens barrel assembly and a left display screen assembly arranged behind the left lens barrel assembly, the left display screen assembly includes a left screen bracket and a left display screen installed on the left screen bracket; The right lens barrel mechanism includes a right lens barrel assembly and a right display screen assembly arranged behind the right lens barrel assembly. The right display screen assembly includes a right screen bracket and a right display screen installed on the right screen bracket. The optical module use a left sight distance adjusting mechanism to adjust the distance between left display screen and left lens barrel assembly, and use the right sight distance adjusting mechanism to adjust the distance between the right display screen and the right lens barrel assembly, so that the sight distance of the left lens barrel assembly and the right lens barrel assembly can be adjusted separately, users can adjust the sight distance of the left lens barrel assembly and the right lens barrel assembly according to the diopter of the left eye and the right eye, so that both eyes can see clearer images, meeting the needs of more users. Moreover, the optical module controls the left lens barrel assembly and the right lens barrel assembly to move left and right, respectively, using the left pupillary distance adjusting mechanism and right pupillary distance adjusting mechanism, in order to realize separate control of the left eye pupil distance and the right eye pupil distance, so that users can adjust the left eye pupil distance or the right eye pupil distance independently according to the pupillary distances of their own eyes, the images seen by both eyes through left lens barrel assembly and right lens barrel assembly are clearer; In addition it can prevent the optical centers of the left lens barrel assembly and the right lens barrel assembly from changing with respect to the display centers of the left display screen and the right display screen, thereby effectively ensuring the display effect of images in the left lens barrel assembly and the right lens barrel assembly.

BRIEF DESCRIPTION OF THE DRAWINGS

The present invention will be further described with reference to the accompanying drawings and embodiments, in which.

In the figures: 3. Optical module; 31. Module housing; 311. Module front housing; 3111. Pupillary distance limit hole; 312. Module rear housing; 313. Metal mounting shaft; 314. Hollowed-out hole; 32. Left lens barrel mechanism; 321. Left lens barrel assembly; 3211. Left lens barrel housing; 3212. Left lens assembly; 3213. Left connecting hole; 322. Left display screen assembly; 3221. Left display screen; 3222. Left screen bracket; 3223. Left structural groove; 3224. Left sliding limit groove; 323. Left connecting pin; 324. Left heat dissipation assembly; 3241. Left heat-conducting silica gel; 3242. Left metal heat dissipation pressure plate; 3243. Left fixing pin; 33. Right lens barrel mechanism; 331. Right lens barrel assembly; 3311. Right lens barrel housing; 3312. Right lens assembly; 3313. Right connecting hole; 332. Right display screen assembly; 3321. Right display screen; 3322. Right screen bracket; 3323. Right structural groove; 3324. Right sliding limit groove; 333. Right connecting pin; 334. Right heat dissipation assembly; 3341. Right heat-conducting silica gel; 3342. Right metal heat dissipation pressure plate; 3343. Right fixing pin; 34. Left sight distance adjusting mechanism; 341. Left adjustment button; 3411. Left rotation control part; 3412. Left driving gear part; 342. Left driven synchronous gear; 343. First left synchronous screw; 3431. First left driven gear part; 3432. First left screw part; 344. Second left synchronous screw; 3441. Second left driven gear part; 3442. Second left screw part; 345. Third left synchronous screw; 3451. Third left driven gear part; 3452. Third left screw part; 346. Left tension wheel; 347. Left synchronous belt; 348. Left sight distance pushing bracket; 3481. Left bracket body; 3482. First left screw hole; 3483. Second left screw hole; 3484. Third left screw hole; 3485. Left bracket connecting part; 3486. Left plastic bone; 35. Right sight distance adjusting mechanism; 351. Right adjustment button; 3511. Right rotation control part; 3512. Right driving gear part; 352. Right driven synchronous gear; 353. First right synchronous screw; 3531. First right driven gear part; 3532. First right screw part; 354. Second right synchronous screw; 3541. Second right driven gear part; 3542. Second right screw part; 355. Third right synchronous screw; 3551. Third right driven gear part; 3552. Third right screw part; 356. Right tension wheel; 357. Right synchronous belt; 358. Right sight distance pushing bracket; 3581. Right bracket body; 3582. First right screw hole; 3583. Second right screw hole; 3584. Third right screw hole; 3585. Right bracket connecting part; 3586. Right plastic bone; 36. Left pupillary distance adjusting mechanism; 361. Left pupillary distance guide shaft; 362. Left lens barrel connecting piece; 3621. Left lens barrel connecting part; 3622. Left guide shaft connecting part; 3623. Left lens barrel through hole; 3624. Left guide through hole; 363. Left pushing piece; 3631. Left slot; 3632. Left pushing insertion hole; 3633. Left pushing gear; 364. Left push button; 3641. Left pushing part; 3642. Left extension convex part; 365. Left pupillary distance sliding limiting piece; 3651. Left sliding gear rack; 366. Metal guide limit shaft; 37. Right pupillary distance adjusting mechanism; 371. Right pupillary distance guide shaft; 372. Right lens barrel connecting piece; 3721. Right lens barrel connecting part; 3722. Right guide shaft connecting part; 3723. Right lens barrel through hole; 3724. Right guide through hole; 373. Right pushing piece; 3731. Right slot; 3732. Right pushing insertion hole; 3733. Right pushing gear; 374. Right push button; 3741. Right pushing part; 3742. Right extension convex part; 375. Right pupillary distance sliding limiting piece; 3751. Right sliding gear rack.

DETAILED DESCRIPTION OF THE EMBODIMENTS

In order to have a clearer understanding of the technical features, objectives and effects of the present invention, specific embodiments of the present invention will now be described in detail with reference to accompanying drawings.

Embodiment 1

FIGS. 1-8 show the optical module 3 of this embodiment. As shown in FIGS. 1-8, the optical module 3 includes a module housing 31, and a left lens barrel mechanism 32, a right lens barrel mechanism 33, a left sight distance adjusting mechanism 34, a right sight distance adjusting mechanism 35, a left pupillary distance adjusting mechanism 36, and a right pupillary distance adjusting mechanism 37 disposed in the module housing 31.

The left lens barrel mechanism 32 includes a left lens barrel assembly 321 and a left display screen 3221 disposed behind the left lens barrel assembly 321 and connected to the left lens barrel assembly 321. Specifically, the left lens barrel mechanism 32 also includes a left display screen assembly 322 sleeved behind the left lens barrel assembly 321, the left display screen assembly 322 includes a left display screen 3221 and a left screen bracket 3222 for mounting the left display screen 3221. The right lens barrel mechanism 33 includes a right lens barrel assembly 331 and a right display screen 3321 disposed behind and connected to the right lens barrel assembly 331. Specifically, the right lens barrel mechanism 33 further includes a right display screen assembly 332 sleeved behind the right lens barrel assembly 331, the right display screen assembly 332 includes a right display screen 3321 and a right screen bracket 3322 for mounting the right display screen 3321.

The left sight distance adjusting mechanism 34 is arranged in the module housing 31 and connected to the left display screen assembly 322, for adjusting the distance between the left display screen 3221 and the left lens barrel assembly 321, so as to realize the sight distance adjustment for the left eye. The right sight distance adjusting mechanism 35 is arranged in the module housing 31 and connected to the right display screen assembly 332, for adjusting the distance between the right display screen 3321 and the right lens barrel assembly 331, so as to realize the sight distance adjustment for the right eye.

The left pupillary distance adjusting mechanism 36 is connected to the left lens barrel mechanism 32 and is used to drive the left lens barrel mechanism 32 to move left and right to achieve pupillary distance adjustment for the left eye. The right pupillary distance adjusting mechanism 37 is connected to the right lens barrel mechanism 33 and is used to drive the right lens barrel mechanism 33 to move left and right to achieve pupillary distance adjustment for the right eye.

In the optical module 3 provided in this embodiment, the left lens barrel mechanism 32 includes a left lens barrel assembly 321 and a left display screen assembly 322 disposed behind the left lens barrel assembly 321. The left display screen assembly 322 includes a left screen bracket 3222 and a left display screen 3221 disposed on the left screen bracket 3222; The right lens barrel mechanism 33 includes a right lens barrel assembly 331 and a right display screen assembly 332 disposed behind the right lens barrel assembly 331, the right display screen assembly 332 includes right screen bracket 3322 and right display screen 3321 disposed on right screen bracket 3322; The left sight distance adjusting mechanism 34 is used to adjust that distance between the left display screen 3221 and the left lens barrel assembly 321, the right sight distance adjusting mechanism 35 is used to adjust that distance between the right display screen 3321 and the right lens barrel assembly 331, so that the sight distance of the left lens barrel assembly 321 and the right lens barrel assembly 331 can be adjusted separately, users can adjust the sight distance of the left lens barrel assembly 321 and the right lens barrel assembly 331 respectively according to the diopter of the left eye and the right eye, so that both eyes can see clearer images, meeting the needs of more users. In addition, because the left display screen 3221 and the right display screen 3321 are respectively arranged behind the left lens barrel assembly 321 and the right lens barrel assembly 331, the left lens barrel assembly 321 and the right lens barrel assembly 331 are controlled respectively by the left pupillary distance adjusting mechanism 36 and the right pupillary distance adjusting mechanism 37, to move left and right, in order to realize separate control of the left eye pupillary distance and the right eye pupillary distance, so that users can independently adjust the pupillary distance of left eye or right eye according to their own pupillary distances, and the images seen by both eyes through left lens barrel assembly 321 and right lens barrel assembly 331 are clearer; and it can prevent the optical centers of the left lens barrel assembly 321 and the right lens barrel assembly 331 from changing with respect to the display centers of the left display screen 3221 and the right display screen 3321, respectively, thereby effectively ensuring the display effect of the images in the left lens barrel assembly 321 and the right lens barrel assembly 331.

Figure 1:
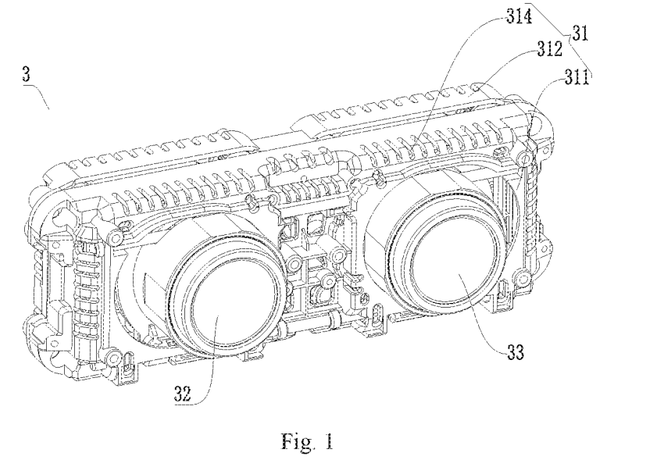
FIG. 1 is a schematic structural diagram of the optical module in embodiment 1 of the invention.
Figure 2:
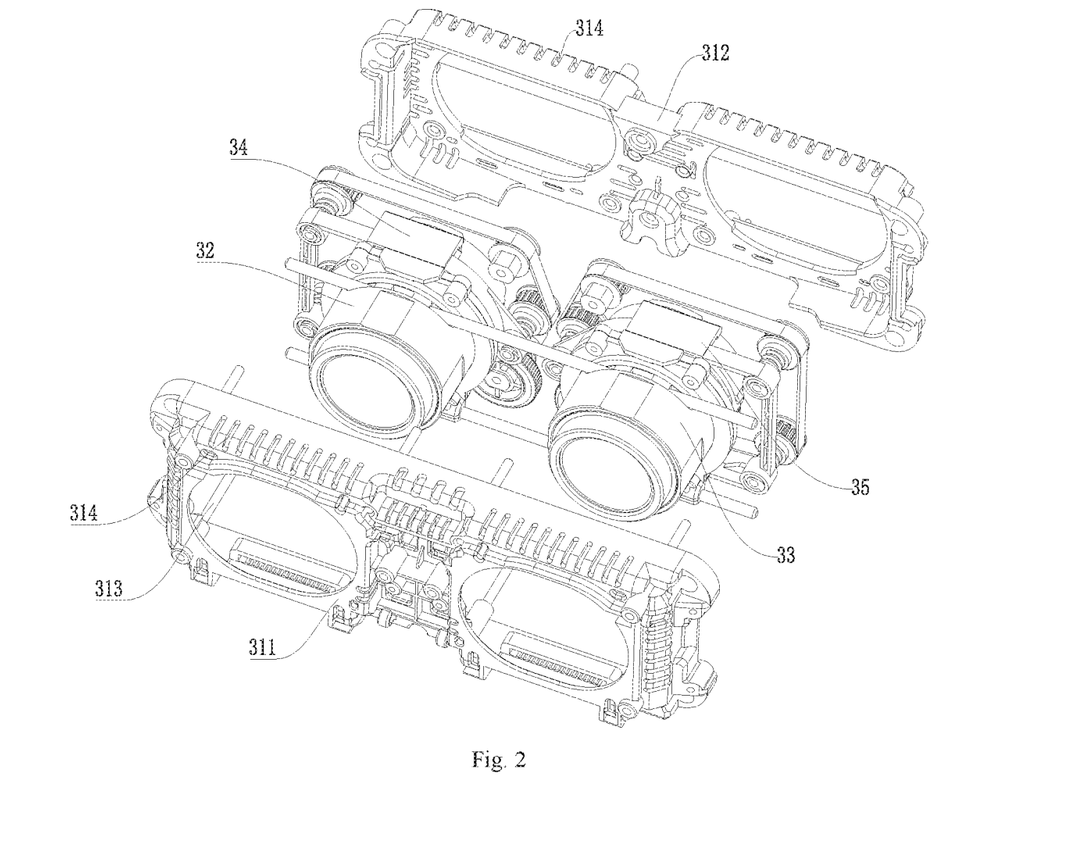
FIG. 2 is a structural decomposition diagram of the optical module in FIG. 1.

As shown in FIGS. 1-2, the module housing 31 includes a module front housing 311 and a module rear housing 312 which are integrally formed; the module front housing 311 is provided with a plurality of metal mounting shafts 313. It can be understood that both the module front housing 311 and the module rear housing 312 are provided with a number of hollowed-out hole 314, for reducing the weight of the module front housing 311 and the module rear housing 312.

Figure 3:
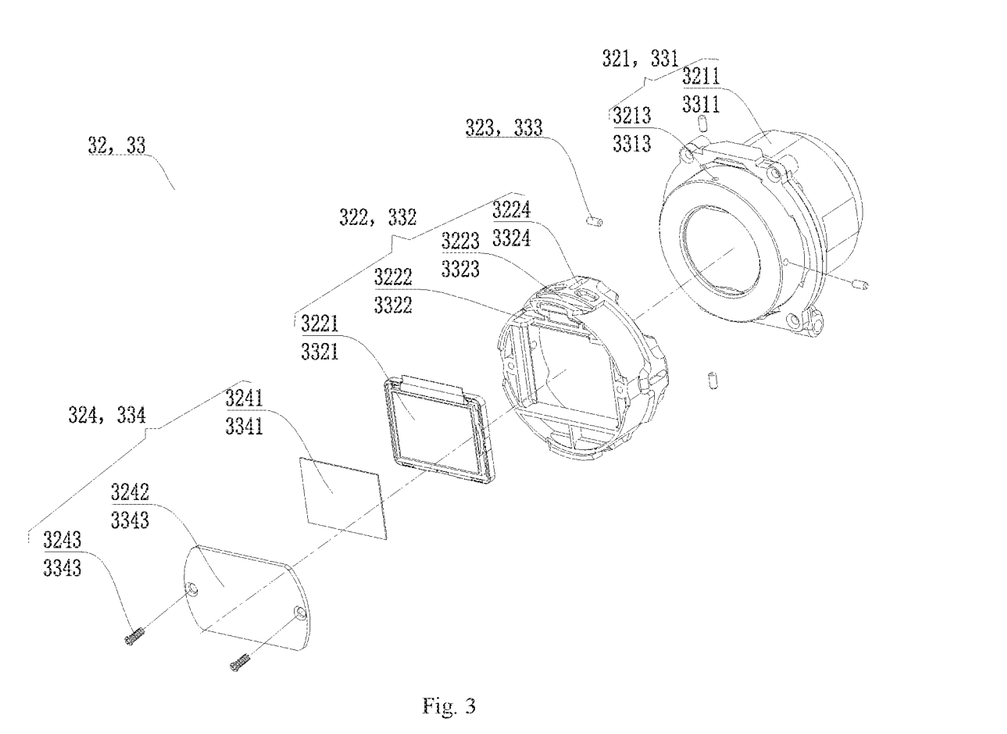
FIG. 3 is a schematic structural diagram of the left lens barrel mechanism and the right lens barrel mechanism in FIG. 2.

As shown in FIG. 3, the left lens barrel mechanism 32 includes a left lens barrel assembly 321 and a left display screen assembly 322 sleeved behind the left lens barrel assembly 321. Specifically, the left lens barrel assembly 321 includes a left lens barrel housing 3211 and a left lens assembly 3212 disposed in the left lens barrel housing 3211. Wherein, the left lens barrel housing 3211 is provided with at least one left connecting hole 3213. The left display screen assembly 322 includes a left display screen 3221 and a left screen bracket 3222 for mounting the left display screen 3221; wherein, the left screen bracket 3222 is provided with at least one left sliding limit groove 3224 arranged in the front-back direction. The left lens barrel mechanism 32 further comprises a left connecting pin 323 that passes through the left sliding limit groove 3224 and is installed on the left connecting hole 3213, used to connect the left screen bracket 3222 and the left lens barrel housing 3211 to prevent the left screen bracket 3222 from falling off the left lens barrel housing 3211, and can make left screen bracket 3222 move relative to the left lens barrel housing 3211 in the front-back direction (i.e., parallel to the left sliding limit groove 3224 direction). In the process of the left screen bracket 3222 moving relative to the left lens barrel housing 3211, the left display screen 3221 on the left screen bracket 3222 is driven to move relative to the left lens barrel assembly 321, so as to adjust the distance between left display screen 3221 and left lens barrel assembly 321 to realize the sight distance adjustment for the left eye.

As shown in FIG. 3, it can be understood that when the left connecting pin 323 passes through the left sliding limit groove 3224 and is installed on the left connecting hole 3213, the left connecting pin 323 protrudes from the left connecting hole 3213 and falls into the left sliding limit groove 3224. In this embodiment, four left connecting holes 3213 are uniformly arranged on the left lens barrel housing 3211; four left sliding limit grooves 3224 are uniformly arranged on the left screen bracket 3222; Correspondingly, four left connecting pins 323 are respectively installed on the four left connecting holes 3213 through the four left sliding limit grooves 3224, making the connection between the left lens barrel housing 3211 and the left screen bracket 3222 closer.

As shown in FIG. 3, the left lens barrel mechanism 32 further comprises a left heat dissipation assembly 324 disposed on the left screen bracket 3222 and near the left display screen 3221, for preventing the left lens assembly 3212 from being too hot and affecting the imaging effect of the left lens assembly 3212. Specifically, the left heat dissipation assembly 324 includes a left heat-conducting silica gel 3241 and a left metal heat dissipation pressure plate 3242, the left heat-conducting silica gel 3241 is disposed between the left display screen 3221 and the left metal heat dissipation pressure plate 3242. Wherein, the left metal heat dissipation pressure plate 3242 may be made of aluminum sheet or other metal materials.

As shown in FIG. 3, in the assembly process of the left lens barrel mechanism 32, the left display screen 3221 needs to be placed on the left screen bracket 3222, and the left heat-conducting silica gel 3241 and the left metal heat dissipation pressure plate 3242 are placed on the left display screen 3221. Then the left metal heat dissipation pressure plate 3242 is fixedly connected to the left screen bracket 3222 by using left fixing pin 3243. Then the left screen bracket 3222 is sleeved on the left lens barrel housing 3211 of the left lens barrel assembly 321, so that the four left connecting holes 3213 on the left lens barrel housing 3211 are respectively located on the four left sliding limit grooves 3224 of the left screen bracket 3222, the four left connecting pins 323 are respectively inserted into the four left connecting holes 3213, to realize the assembly of the left lens barrel mechanism 32. It can be understood that the left screen bracket 3222 in the assembled left lens barrel mechanism 32 can move back and forth relative to the left lens barrel housing 3211 (i.e., in the direction of the left sliding limit groove 3224), and its movement range is the length of the left sliding limit groove 3224. It can be understood that the left screen bracket 3222 is sleeved on the left lens barrel housing 3211, that is, the left screen bracket 3222 is positioned behind the left lens assembly 3212, which can achieve a good dustproof effect.

As shown in FIG. 3, the right lens barrel mechanism 33 includes a right lens barrel assembly 331 and a right display screen assembly 332 sleeved behind the right lens barrel assembly 331. Specifically, the right lens barrel assembly 331 includes a right lens barrel housing 3311 and a right lens assembly 3312 disposed in the right lens barrel housing 3311. Wherein, the right lens barrel housing 3311 is provided with at least one right connecting hole 3313. The right display screen assembly 332 includes a right display screen 3321 and a left screen bracket 3322 for mounting the right display screen 3321; wherein, the right screen bracket 3322 is provided with at least one right sliding limit groove 3324 arranged in the front-back direction. The right lens barrel mechanism 33 further comprises a right connecting pin 333 that passes through the right sliding limit groove 3324 and is installed on the right connecting hole 3313, used to connect the right screen bracket 3322 and the right lens barrel housing 3311 to prevent the right screen bracket 3322 from falling off the right lens barrel housing 3311, and can make right screen bracket 3322 move relative to the right lens barrel housing 3311 in the front-back direction (i.e., parallel to the right sliding limit groove 3324 direction). In the process of the right screen bracket 3322 moving relative to the right lens barrel housing 3311, the right display screen 3321 on the right screen bracket 3322 is driven to move relative to the right lens barrel assembly 331, so as to adjust the distance between right display screen 3321 and right lens barrel assembly 331 to realize the sight distance adjustment for the right eye.

It can be understood that when the right connecting pin 333 passes through the right sliding limit groove 3324 and is installed on the right connecting hole 3313, the right connecting pin 333 protrudes from the right connecting hole 3313 and falls into the right sliding limit groove 3324.

In this embodiment, four right connecting holes 3313 are uniformly arranged on the right lens barrel housing 3311; four right sliding limit grooves 3324 are uniformly arranged on the right screen bracket 3322; Correspondingly, four right connecting pins 333 are respectively installed on the four right connecting holes 3313 through the four right sliding limit grooves 3324, making the connection between the right lens barrel housing 3311 and the right screen bracket 3322 closer.

As shown in FIG. 3, the right lens barrel mechanism 33 further comprises a right heat dissipation assembly 334 disposed on the right screen bracket 3322 and near the right display screen 3321, for preventing the right lens assembly 3312 from being too hot and affecting the imaging effect of the right lens assembly 3312. Specifically, the right heat dissipation assembly 334 includes a right heat-conducting silica gel 3341 and a right metal heat dissipation pressure plate 3342, the right heat-conducting silica gel 3341 is disposed between the right display screen 3321 and the right metal heat dissipation pressure plate 3342. Wherein, the left metal heat dissipation pressure plate 3242 may be made of aluminum sheet or other metal materials.

As shown in FIG. 3, in the assembly process of the right lens barrel mechanism 33, the right display screen 3321 needs to be placed on the right screen bracket 3322, and the right heat-conducting silica gel 3341 and the right metal heat dissipation pressure plate 3342 are placed on the right display screen 3321. Then the right metal heat dissipation pressure plate 3342 is fixedly connected to the right screen bracket 3322 by using right fixing pin 3343. Then the right screen bracket 3322 is sleeved on the right lens barrel housing 3311 of the right lens barrel assembly 331, so that the four right connecting holes 3313 on the right lens barrel housing 3311 are respectively located on the four right sliding limit grooves 3324 of the right screen bracket 3322, the four right connecting pins 333 are respectively inserted into the four right connecting holes 3313, to realize the assembly of the right lens barrel mechanism 33. It can be understood that the right screen bracket 3322 in the assembled right lens barrel mechanism 33 can move back and forth relative to the right lens barrel housing 3311 (i.e., in the direction of the right sliding limit groove 3324), and its movement range is the length of the right sliding limit groove 3324. It can be understood that the right screen bracket 3322 is sleeved on the right lens barrel housing 3311, that is, the right screen bracket 3322 is positioned behind the right lens assembly 3312, which can achieve a good dustproof effect.

Figure 4:
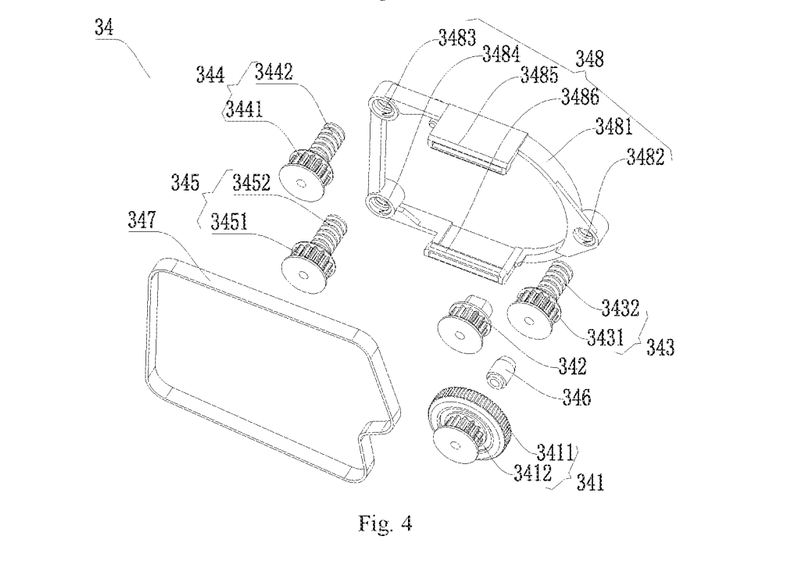
FIG. 4 is a structural decomposition diagram of the left sight distance adjusting mechanism in FIG. 2.
Figure 5:
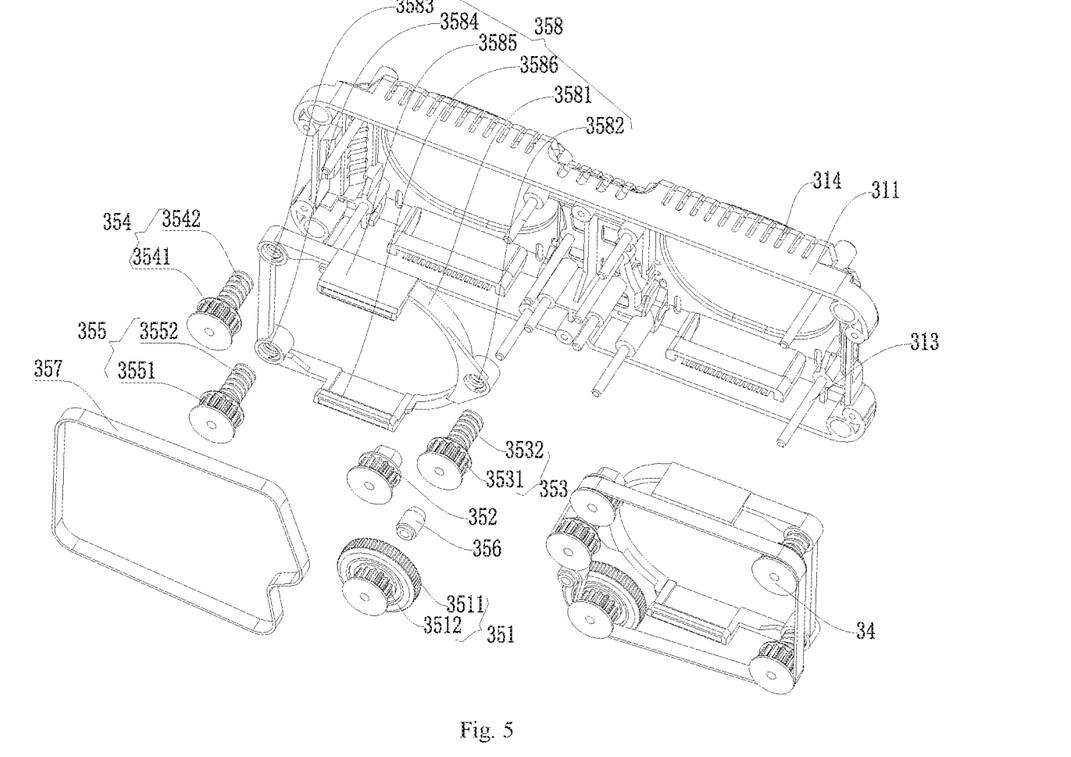
FIG. 5 is an assembled state diagram of the left sight distance adjusting mechanism and the right sight distance adjusting mechanism in FIG. 2.
Figure 6:
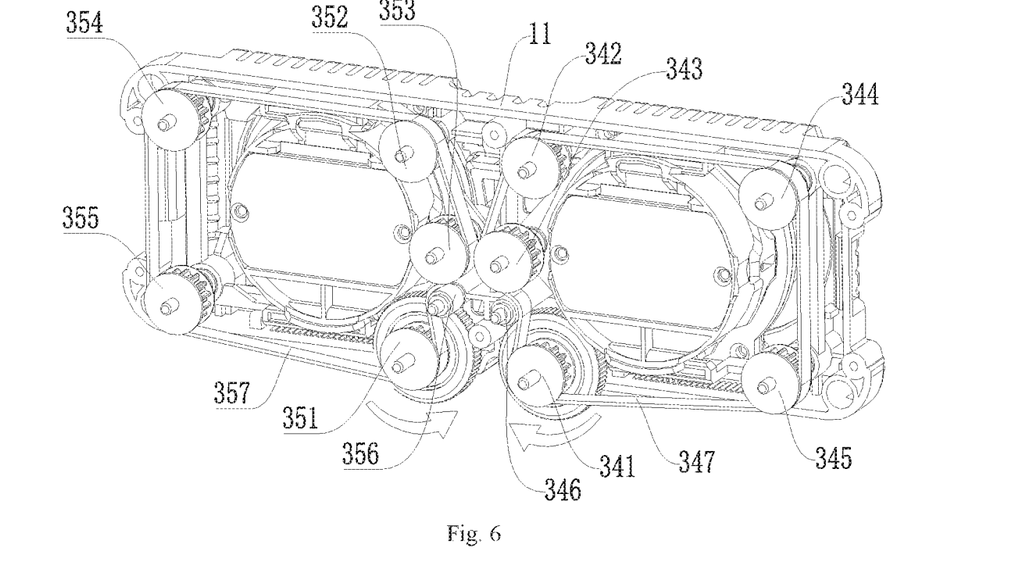
FIG. 6 is an assembled state diagram of the left sight distance adjusting mechanism and the right sight distance adjusting mechanism in FIG. 2.

As shown in FIGS. 4 and 5, the left sight distance adjusting mechanism 34 includes a left adjustment button 341, a left driven synchronous gear 342, a first left synchronous screw 343, a second left synchronous screw 344, a third left synchronous screw 345, a left tension wheel 346, a left synchronous belt 347 and a left sight distance pushing bracket 348. The left sight distance pushing bracket 348 is connected to the left screen bracket 3222, the left sight distance pushing bracket 348 is disposed on the first left synchronous screw 343, the second left synchronous screw 344, and the third left synchronous screw 345. The left adjustment button 341, left driven synchronous gear 342, first left synchronous screw 343, second left synchronous screw 344, third left synchronous screw 345, left tension wheel 346 and left synchronous belt 347 are matched with one another, so that the left sight distance pushing bracket 348 drives the left screen bracket 3222 to move back and forth. It can be understood that the left adjustment button 341, left driven synchronous gear 342, first left synchronous screw 343, second left synchronous screw 344, third left synchronous screw 345 and left tension wheel 346 of the left sight distance adjusting mechanism 34 are disposed on the metal mounting shaft 313 of the module front housing 311, matched with the left synchronous belt 347, to realize the transmission effect.

As shown in FIG. 4, the left adjustment button 341 includes a left rotation control part 3411 and a left driving gear part 3412 which are integrally formed. The first left synchronous screw 343 includes a first left driven gear part 3431 and a first left screw part 3432 which are integrally formed. The second left synchronous screw 344 includes a second left driven gear part 3441 and a second left screw part 3442 which are integrally formed. The third left synchronous screw 345 includes a third left driven gear part 3451 and a third left screw part 3452 which are integrally formed. The left sight distance pushing bracket 348 includes a left bracket body 3481, a first left screw hole 3482, second left screw hole 3483, third left screw hole 3484, and left bracket connecting part 3485 disposed on the left bracket body 3481. Wherein, the left driving gear part 3412 of the left adjustment button 341, left tension wheel 346, left driven synchronous gear 342, first left driven gear part 3431 of the first left synchronous screw 343, second left driven gear part 3441 of the second left synchronous screw 344, and third left driven gear part 3451 of the third left synchronous screw 345 match with the left synchronous belt 347 to realize synchronous transmission. It can be understood that the first left screw part 3432 of the first left synchronous screw 343 matches with the first left screw hole 3482, the second left screw part 3442 of the second left synchronous screw 344 matches with the second left screw hole 3483, and the third left screw part 3452 of the third left synchronous screw 345 matches with the third left screw hole 3484, to make the left bracket body 3481 move back and forth. It can be understood that the first left driven gear part 3431, second left driven gear part 3441 and third left driven gear part 3451 are provided with outer spiral teeth, correspondingly, the first left screw hole 3482, second left screw hole 3483 and third left screw hole 3484 are provided with inner spiral teeth matched with the outer spiral teeth.

Specifically, as shown in FIG. 4, the left sight distance pushing bracket 348 comprises two left bracket connecting parts 3485 arranged opposite to each other from top to bottom, and each left bracket connecting part 3485 is provided with left plastic bones 3486 extending inward; Correspondingly, as shown in FIG. 3, the left screen bracket 3222 is provided with two left structural grooves 3223 matched with the left plastic bones 3486 oppositely in the vertical direction. In the assembly process, the two left bracket connecting parts 3485 and the two left plastic bones 3486 on the left sight distance pushing bracket 348 are inserted into the two left structural grooves 3223 of the left screen bracket 3222 respectively, to realize the connection between the left sight distance pushing bracket 348 and the left screen bracket 3222, so that the left screen bracket 3222 can be driven to move when the left sight distance pushing bracket 348 moves, so the left display screen 3221 on the left screen bracket 3222 can move relative to the left lens assembly 3212.

In the assembly process of the left sight distance adjusting mechanism 34, the left sight distance pushing bracket 348, first left synchronous screw 343, second left synchronous screw 344, and third left synchronous screw 345 are assembled (i.e., the first left synchronous screw 343, second left synchronous screw 344, and third left synchronous screw 345 are respectively inserted into the first left screw hole 3482, second left screw hole 3483, and third left screw hole 3484), and making the first left synchronous screw 343, second left synchronous screw 344, and third left synchronous screw 345 rotate to the end. It can be understood that when assembling the left sight distance pushing bracket 348 and the first left synchronous screw 343, the second left synchronous screw 344 and the third left synchronous screw 345, the first left screw part 3432, the third left screw part 3452 and the third left screw part 3452 need to be lubricated, so as to realize the effect of no abnormal noise when adjusting, and uniform rotational force. The first left synchronous screw 343, second left synchronous screw 344 and third left synchronous screw 345 are then assembled to the metal mounting shaft 313 of the module front housing 311. Then, the left adjustment button 341, left driven synchronous gear 342 and left tension wheel 346 are assembled to the metal mounting shaft 313 of the module front housing 311, the left synchronous belt 347 is then sleeved on the left driving gear part 3412 of the left adjustment button 341, the left tension wheel 346, the left driven synchronous gear 342, the first left driven gear part 3431 of first left synchronous screw 343, the second left driven gear part 3441 of the second left synchronous screw 344, the third left driven gear part 3451 of the third left synchronous screw 345, to complete the assembly of the left sight distance adjusting mechanism 34. Then, the two left bracket connecting part 3485 and the two left plastic bones 3486 of the left sight distance pushing bracket 348 are inserted into the two left structural groove 3223 of the left screen bracket 3222 respectively, so as to assemble the left lens barrel mechanism 32 to the left sight distance adjusting mechanism 34.

It can be understood that after the left lens barrel mechanism 32 is assembled to the left sight distance adjusting mechanism 34, pushing the left adjustment button 341 with hand, so that the left synchronous belt 347 drives the left driven synchronous gear 342, first left synchronous screw 343, second left synchronous screw 344, third left synchronous screw 345 and the left tension wheel 346 to rotate simultaneously; so that the first left driven gear part 3431 of the first left synchronous screw 343, second left driven gear part 3441 of the second left synchronous screw 344, and third left driven gear part 3451 of the third left synchronous screw 345 also rotate; Because the inner spiral teeth on the first left screw hole 3482, second left screw hole 3348, and third left screw hole 3484 of the left sight distance pushing bracket 348 are matched with the outer spiral teeth on the first left driven gear part 3431, second left driven gear part 3441, and third left driven gear part 3451, respectively, with the left sight distance pushing bracket 348 pushed by the outer spiral teeth, different forward and backward movements are generated according to the different rotation directions. The left sight distance pushing bracket 348 is provided with two left plastic bones 3486 oppositely arranged. The two left plastic bones 3486 are mounted in the left structural grooves 3223 of the left screen bracket 3222. So that the left screen bracket 3222 is driven to move back and forth when the left sight distance pushing bracket 348 moves back and forth, the range of the left screen bracket 3222 moving back and forth is the length of the left sliding limit groove 3224. Because the left screen bracket 3222 is sleeved behind the left lens barrel assembly 321, and it is provided with a left display screen 3221; wherein, the left lens barrel assembly 321 includes a left lens barrel housing 3211 and a left lens assembly 3212 disposed in the left lens barrel housing 3211. When the left eye views the image displayed on the left display screen 3221 through the left lens barrel assembly 321, the user can adjust the left screen bracket 3222 to move the left display screen 3221 forward and backward, to realize the sight distance adjustment of the left eye, so that it can be applied to hyperopia or myopia of the left eye.

As shown in FIG. 5, the right sight distance adjusting mechanism 35 includes a right adjustment button 351, a right driven synchronous gear 352, a first right synchronous screw 353, a second right synchronous screw 354, a third right synchronous screw 355, a right tension wheel 356, a right synchronous belt 357 and a right sight distance pushing bracket 358. The right sight distance pushing bracket 358 is connected to the right screen bracket 3222, the right sight distance pushing bracket 358 is disposed on the first right synchronous screw 353, the second right synchronous screw 354, and the third right synchronous screw 355. The right adjustment button 351, right driven synchronous gear 352, first right synchronous screw 353, second right synchronous screw 354, third right synchronous screw 355, right tension wheel 356 and right synchronous belt 357 are matched with one another, so that the right sight distance pushing bracket 358 drives the right screen bracket 3322 to move back and forth. It can be understood that the right adjustment button 351, right driven synchronous gear 352, first right synchronous screw 353, second right synchronous screw 354, third right synchronous screw 355 and right tension wheel 356 of the right sight distance adjusting mechanism 35 are disposed on the metal mounting shaft 313 of the module front housing 311, matched with the right synchronous belt 357, to realize the transmission effect.

As shown in FIG. 5, the right adjustment button 351 includes a right rotation control part 3511 and a right driving gear part 3512 which are integrally formed. The first right synchronous screw 353 includes a first right driven gear part 3531 and a first right screw part 3532 which are integrally formed. The second right synchronous screw 354 includes a second right driven gear part 3541 and a second right screw part 3542 which are integrally formed. The third right synchronous screw 355 includes a third right driven gear part 3551 and a third right screw part 3552 which are integrally formed. The right sight distance pushing bracket 358 includes a right bracket body 3581, a first right screw hole 3582, second right screw hole 3583, third right screw hole 3584, and right bracket connecting part 3585 disposed on the right bracket body 3581. Wherein, the right driving gear part 3512 of the right adjustment button 351, right tension wheel 356, right driven synchronous gear 352, first right driven gear part 3531 of the first right synchronous screw 353, second right driven gear part 3541 of the second right synchronous screw 354, and third right driven gear part 3551 of the third right synchronous screw 355 match with the right synchronous belt 357 to realize synchronous transmission. It can be understood that the first right screw part 3532 of the first right synchronous screw 353 matches with the first right screw hole 3582, the second right screw part 3542 of the second right synchronous screw 354 matches with the second right screw hole 3583, and the third right screw part 3552 of the third right synchronous screw 355 matches with the third right screw hole 3584, to make the right bracket body 3581 move back and forth. It can be understood that the first right driven gear part 3531, second right driven gear part 3541 and third right driven gear part 3551 are provided with outer spiral teeth, correspondingly, the first right screw hole 3582, second right screw hole 3583 and third right screw hole 3584 are provided with inner spiral teeth matched with the outer spiral teeth.

As shown in FIG. 5, the right sight distance pushing bracket 358 comprises two right bracket connecting parts 3585 arranged opposite to each other from top to bottom, and each right bracket connecting part 3585 is provided with right plastic bones 3586 extending inward; Correspondingly, as shown in FIG. 3, the right screen bracket 3322 is provided with two right structural grooves 3323 matched with the right plastic bones 3586 oppositely in the vertical direction. In the assembly process, the two right bracket connecting parts 3585 and the two right plastic bones 3586 on the right sight distance pushing bracket 358 are inserted into the two right structural grooves 3323 of the right screen bracket 3322 respectively, to realize the connection between the right sight distance pushing bracket 358 and the right screen bracket 3322, so that the right screen bracket 3322 can be driven to move when the right sight distance pushing bracket 358 moves, so the right display screen 3321 on the right screen bracket 3322 can move relative to the right lens assembly 3312.

In the assembly process of the right sight distance adjusting mechanism 35, the right sight distance pushing bracket 358, first right synchronous screw 353, second right synchronous screw 354, and third right synchronous screw 355 are assembled (i.e., the first right synchronous screw 353, second right synchronous screw 354, and third right synchronous screw 355 are respectively inserted into the first right screw hole 3582, second right screw hole 3583, and third right screw hole 3584), and making the first right synchronous screw 353, second right synchronous screw 354, and third right synchronous screw 355 rotate to the end. It can be understood that when assembling the right sight distance pushing bracket 358 and the first right synchronous screw 353, the second right synchronous screw 354 and the third right synchronous screw 355, the first right screw part 3532, the third right screw part 3552 and the third right screw part 3552 need to be lubricated, so as to realize the effect of no abnormal noise when adjusting, and uniform rotational force. The first right synchronous screw 353, second right synchronous screw 354 and third right synchronous screw 355 are then assembled to the metal mounting shaft 313 of the module front housing 311. Then, the right adjustment button 351, right driven synchronous gear 352 and right tension wheel 356 are assembled to the metal mounting shaft 313 of the module front housing 311, the right synchronous belt 357 is then sleeved on the right driving gear part 3512 of the right adjustment button 351, the right tension wheel 356, the right driven synchronous gear 352, the first right driven gear part 3531 of first right synchronous screw 353, the second right driven gear part 3541 of the second right synchronous screw 354, the third right driven gear part 3551 of the third right synchronous screw 355, to complete the assembly of the right sight distance adjusting mechanism 35. Then, the two right bracket connecting part 3585 and the two right plastic bones 3586 of the right sight distance pushing bracket 358 are inserted into the two right structural groove 3323 of the right screen bracket 3322 respectively, so as to assemble the right lens barrel mechanism 33 to the right sight distance adjusting mechanism 35.

It can be understood that after the right lens barrel mechanism 33 is assembled to the right sight distance adjusting mechanism 35, pushing the right adjustment button 351 with hand, so that the right synchronous belt 357 drives the right driven synchronous gear 352, first right synchronous screw 353, second right synchronous screw 354, third right synchronous screw 355 and the right tension wheel 356 to rotate simultaneously; so that the first right driven gear part 3531 of the first right synchronous screw 353, second right driven gear part 3541 of the second right synchronous screw 354, and third right driven gear part 3551 of the third right synchronous screw 355 also rotate; Because the inner spiral teeth on the first right screw hole 3582, second right screw hole 3358, and third right screw hole 3584 of the right sight distance pushing bracket 358 are matched with the outer spiral teeth on the first right driven gear part 3531, second right driven gear part 3541, and third right driven gear part 3551, respectively, with the right sight distance pushing bracket 358 pushed by the outer spiral teeth, different forward and backward movements are generated according to the different rotation directions. The right sight distance pushing bracket 358 is provided with two right plastic bones 3586 oppositely arranged. The two right plastic bones 3586 are mounted in the right structural grooves 3323 of the right screen bracket 3322. So that the right screen bracket 3322 is driven to move back and forth when the right sight distance pushing bracket 358 moves back and forth, the range of the right screen bracket 3322 moving back and forth is the length of the right sliding limit groove 3324. Because the right screen bracket 3322 is sleeved behind the right lens barrel assembly 331, and it is provided with a right display screen 3321; wherein, the right lens barrel assembly 331 includes a right lens barrel housing 3311 and a right lens assembly 3312 disposed in the right lens barrel housing 3311. When the right eye views the image displayed on the right display screen 3321 through the right lens barrel assembly 331, the user can adjust the right screen bracket 3322 to move the right display screen 3321 forward and backward, to realize the sight distance adjustment of the right eye, so that it can be applied to hyperopia or myopia of the right eye.

It can be understood that, in the optical module 3 provided in this embodiment, setting the left sight distance adjusting mechanism 34 for adjusting the distance between the left display screen 3221 and the left lens barrel assembly 321 and the right sight distance adjusting mechanism 35 for adjusting the distance between the right display screen 3321 and the right lens barrel assembly 331 respectively, so that the sight distance of the left lens barrel assembly 321 and the right lens barrel assembly 331 can be separately adjusted, users can adjust the sight distance of the left lens barrel assembly and the right lens barrel assembly according to the diopter of the left eye and the right eye, so that both eyes can see clearer images, meeting the needs of more users.

Figure 7:
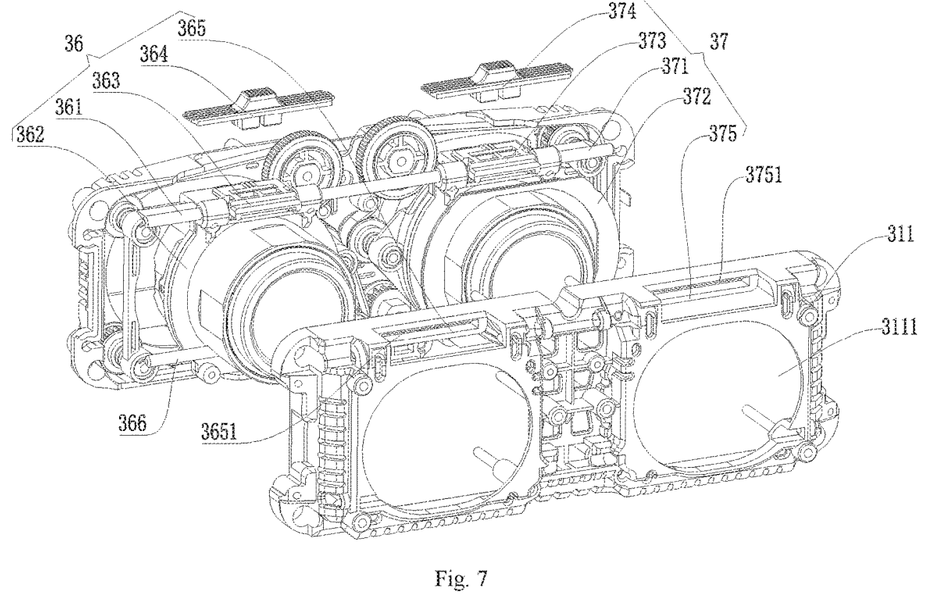
FIG. 7 is a structural decomposition diagram of the left pupillary distance adjusting mechanism and the right pupillary distance adjusting mechanism in FIG. 1.
Figure 8:
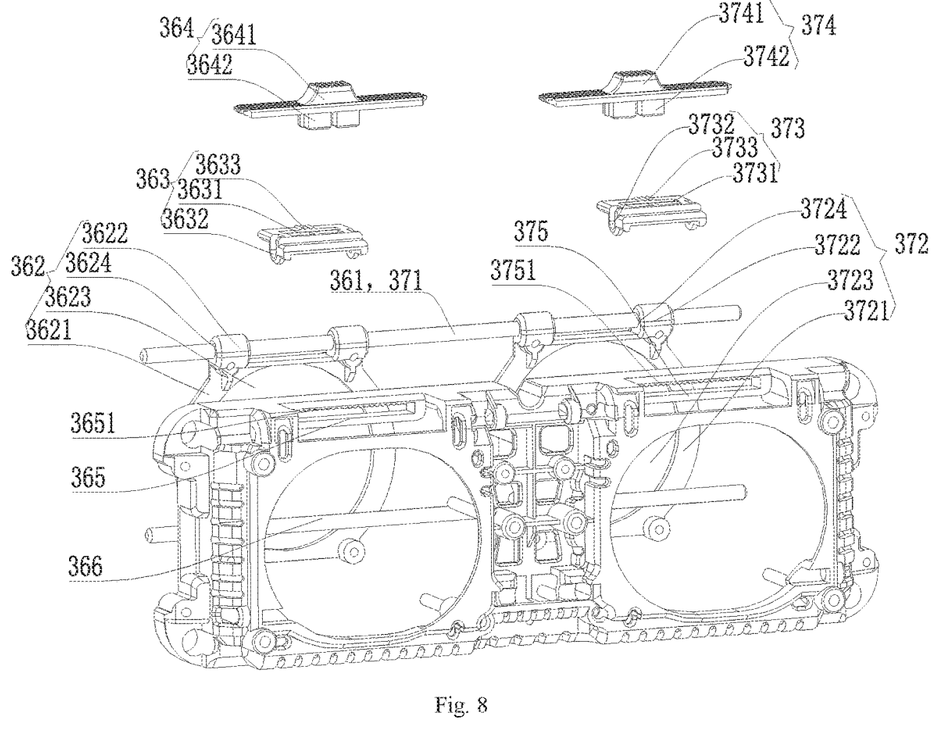
FIG. 8 is an another structural decomposition diagram of the left pupillary distance adjusting mechanism and the right pupillary distance adjusting mechanism in FIG. 1.

As shown in FIGS. 7 and 8, the left pupillary distance adjusting mechanism 36 includes a left pupillary distance guide shaft 361, a left lens barrel connecting piece 362, a left pushing piece 363, and a left push button 364. Wherein, the left pupillary distance guide shaft 361 is disposed on the module housing 31. In this embodiment, the left pupillary distance guide shaft 361 is disposed on the module front housing 311. The module front housing 311 is provided with a pupillary distance limit hole 3111 for the left lens barrel assembly 321 to pass through, to limit the range of the pupillary distance adjustment of the left eye. The left lens barrel connecting piece 362 is disposed on the left pupillary distance guide shaft 361, can move along the left pupillary distance guide shaft 361, and is connected to the left lens barrel assembly 321, so that the left lens barrel connecting piece 362 can drive the left lens barrel assembly 321 to move when moving, so as to separately control the left lens barrel assembly 321 to move right and left, thereby adjusting the left eye pupillary distance. The left pushing piece 363 is disposed on the left pupillary distance guide shaft 361, can move along the left pupillary distance guide shaft 361, and can drive the left lens barrel connecting piece 362 to move along the left pupillary distance guide shaft 361. The left push button 364 is disposed on the left pushing piece 363, for controlling the left pushing piece 363 to move along the left pupillary distance guide shaft 361.

When in use, users can push the left push button 364 to move left and right, so that the left pushing piece 363 connected to the left push button 364 moves left and right, and drives the left lens barrel connecting piece 362 and the left lens barrel assembly 321 to move, so as to realize the pupillary distance adjustment of the left eye.

As shown in FIG. 8, the left lens barrel connecting piece 362 includes a left lens barrel connecting par 3621 and a left guide shaft connecting part 3622 which are integrally formed. Wherein, the left lens barrel connecting part 3621 is provided with a left lens barrel through hole 3623 for the left lens barrel assembly 321 to pass through. The left guide shaft connecting part 3622 is provided with a left guide through hole 3624 for the left pupillary distance guide shaft 361 to pass through. The left push button 364 includes a left pushing part 3641 and a left extension convex part 3642 which are integrally formed. The left pushing piece 363 is provided with a left slot 3361 matched with a left extension convex part 3642 and a left pushing insertion hole 3632 for the left pupillary distance guide shaft 361 to pass through. In the assembling process of the left pupillary distance adjusting mechanism 36, the left extension conversion part 3642 on the left push button 364 is inserted into the left slot 3631 of the left pushing piece 363. The left lens barrel through hole 3362 of the left lens barrel connecting piece 362 and the left pushing insertion hole 3632 of the left pushing piece 363 are located in a straight line, and the left pupillary distance guide shaft 361 passes through the left lens barrel through hole 3623 and the left pushing insertion hole 3632, then the left pupillary distance guide shaft 361 is mounted on the module housing 31, the assembly is completed.

Specifically, the left lens barrel connecting piece 362 is provided with two left guide through holes 3624, and the left pushing piece 363 is provided with one left pushing insertion hole 3632, when cooperating with the left pupillary distance guide shaft 361, the left pushing insertion hole 3632 is disposed between the two left guide through holes 3624, so that the left pushing piece 363 can drive the left lens barrel connecting piece 362 to move when moving. Or, the left lens barrel connecting piece 362 is provided with one left guide through hole 3624, and the left pushing piece 363 is provided with two left pushing insertion holes 3632, when cooperating with the left pupillary distance guide shaft 361, the left guide through hole 3624 is disposed between the two left pushing insertion holes 3632, so that the left pushing piece 363 can drive the left lens barrel connecting piece 362 to move when moving.

Specifically, the left pupillary distance adjusting mechanism 36 further includes a left push limiting assembly (not shown) disposed inside the left pushing piece 363 and the module housing 31. In this embodiment, the left pushing piece 363 is disposed inside the module front housing 311, for limiting the distance that the left pushing piece 363 moves each time when the left push button 364 pushing the left pushing piece 363 to move left and right, making the pupillary distance adjustment of the left eye more precise.

Specifically, the left push limiting assembly includes a left pupillary distance sliding limiting piece 365 disposed inside the module housing 31, the left pupillary distance sliding limiting piece 365 and the module housing 31 match to form a left sliding space for the left pushing piece 363 to be inserted, the left pushing piece 363 needs to be inserted when assembling the left pupillary distance adjusting mechanism 36. The left pupillary distance sliding limiting piece 365 on the inside of the sliding space or one side of the module housing 31 is provided with a left sliding gear rack 3651, correspondingly, the part of the left sliding space where the left pushing piece 363 inserted is provided with a left pushing gear 3633 matched with the left sliding gear rack 3651. When the left pushing piece 363 is pushed to move left and right by the left push button 364, the left pushing gear 3363 matches with the left sliding gear rack 3651, so as to accurately adjust the distance that the left pushing piece 363 moves along the left pupillary distance guide shaft 361, achieving precise pupillary distance adjustment of the left eye. In this embodiment, the left pupillary distance sliding limiting piece 365 is disposed inside the module front housing 311.

As shown in FIGS. 7 and 8, the right pupillary distance adjusting mechanism 37 includes a right pupillary distance guide shaft 371, a right lens barrel connecting piece 372, a right pushing piece 373, and a right push button 374. Wherein, the right pupillary distance guide shaft 371 is disposed on the module housing 31. In this embodiment, the right pupillary distance guide shaft 371 is disposed on the module front housing 311. The module front housing 311 is provided with a pupillary distance limit hole 3111 for the right lens barrel assembly 331 to pass through, to limit the range of the pupillary distance adjustment of the right eye. The right lens barrel connecting piece 372 is disposed on the right pupillary distance guide shaft 371, can move along the right pupillary distance guide shaft 371, and is connected to the right lens barrel assembly 331, so that the right lens barrel connecting piece 372 can drive the right lens barrel assembly 331 to move when moving, so as to separately control the right lens barrel assembly 331 to move left and right, thereby adjusting the right eye pupillary distance. The right pushing piece 373 is disposed on the right pupillary distance guide shaft 371, can move along the right pupillary distance guide shaft 371, and can drive the right lens barrel connecting piece 372 to move along the right pupillary distance guide shaft 371. The right push button 374 is disposed on the right pushing piece 373, for controlling the right pushing piece 373 to move along the right pupillary distance guide shaft 371. When in use, users can push the right push button 374 to move left and right, so that the right pushing piece 373 connected to the right push button 374 moves right and right, and drives the right lens barrel connecting piece 372 and the right lens barrel assembly 331 to move, so as to realize the pupillary distance adjustment of the right eye.

As shown in FIG. 8, the right lens barrel connecting piece 372 includes a right lens barrel connecting par 3721 and a right guide shaft connecting part 3722 which are integrally formed. Wherein, the right lens barrel connecting part 3721 is provided with a right lens barrel through hole 3723 for the right lens barrel assembly 331 to pass through. The right guide shaft connecting part 3722 is provided with a right guide through hole 3724 for the right pupillary distance guide shaft 371 to pass through. The right push button 374 includes a right pushing part 3741 and a right extension convex part 3742 which are integrally formed. The right pushing piece 373 is provided with a right slot 3371 matched with a right extension convex part 3742 and a right pushing insertion hole 3732 for the right pupillary distance guide shaft 371 to pass through. In the assembling process of the right pupillary distance adjusting mechanism 37, the right extension conversion part 3742 on the right push button 374 is inserted into the right slot 3731 of the right pushing piece 373. The right lens barrel through hole 3723 of the right lens barrel connecting piece 372 and the right pushing insertion hole 3732 of the right pushing piece 373 are located in a straight line, and the right pupillary distance guide shaft 371 passes through the right lens barrel through hole 3723 and the right pushing insertion hole 3732, then the right pupillary distance guide shaft 371 is mounted on the module housing 31, the assembly is completed.

Specifically, the right lens barrel connecting piece 372 is provided with two right guide through holes 3724, and the right pushing piece 373 is provided with one right pushing insertion hole 3732, when cooperating with the right pupillary distance guide shaft 371, the right pushing insertion hole 3732 is disposed between the two right guide through holes 3724, so that the right pushing piece 373 can drive the right lens barrel connecting piece 372 to move when moving. Or, the right lens barrel connecting piece 372 is provided with one right guide through hole 3724, and the right pushing piece 373 is provided with two right pushing insertion holes 3732, when cooperating with the right pupillary distance guide shaft 371, the right guide through hole 3724 is disposed between the two right pushing insertion holes 3732, so that the right pushing piece 373 can drive the right lens barrel connecting piece 372 to move when moving.

Specifically, the right pupillary distance adjusting mechanism 37 further includes a right push limiting assembly (not shown) disposed inside the right pushing piece 373 and the module housing 31. In this embodiment, the right pushing piece 373 is disposed inside the module front housing 311, for limiting the distance that the right pushing piece 373 moves each time when the right push button 374 pushing the right pushing piece 373 to move left and right, making the pupillary distance adjustment of the right eye more precise.

Specifically, the right push limiting assembly includes a right pupillary distance sliding limiting piece 375 disposed inside the module housing 31, the right pupillary distance sliding limiting piece 375 and the module housing 31 match to form a right sliding space for the right pushing piece 373 to be inserted, the right pushing piece 373 needs to be inserted when assembling the right pupillary distance adjusting mechanism 37. The right pupillary distance sliding limiting piece 375 on the inside of the sliding space or one side of the module housing 31 is provided with a right sliding gear rack 3751, correspondingly, the part of the right sliding space where the right pushing piece 373 inserted is provided with a right pushing gear 3733 matched with the right sliding gear rack 3751. When the right pushing piece 373 is pushed to move left and right by the right push button 374, the right pushing gear 3373 matches with the right sliding gear rack 3751, so as to accurately adjust the distance that the right pushing piece 373 moves along the right pupillary distance guide shaft 371, achieving precise pupillary distance adjustment of the right eye. In this embodiment, the right pupillary distance sliding limiting piece 375 is disposed inside the module front housing 311.

It can be understood that in the present embodiment, the left pupillary distance guide shaft 361 and the right pupillary distance guide shaft 371 can be the same metal guide shaft that passes through the module front housing 311, the left lens barrel connecting piece 362, the left pushing piece 363, the right lens barrel connecting piece 372 and the right pushing piece 373, it is beneficial to ensure that the left eye pupillary distance adjustment and the right eye pupillary distance adjustment are in a straight line, and the assembly time of the left pupillary distance guide shaft 361 and the right pupillary distance guide shaft 371 can be saved.

Furthermore, the optical module 3 further includes a metal guide limit shaft 366 disposed on the module housing 31 and passing through the left lens barrel housing 3211 and the right lens barrel housing 3311; The metal guide limit shaft 366 is parallel to the left pupillary distance guide shaft 361 and the right pupillary distance guide shaft 371. The left pupillary distance guide shaft 361, the right pupillary distance guide shaft 371 and the metal guide limit shaft 366 are made of metal materials with high hardness, high precision and strong friction resistance, which can ensure balance and parallelism in the process of pupillary distance adjustment and avoid deformation during the process of pupillary distance adjustment.

In the optical module 3 provided in this embodiment, because the left display screen 3221 and the right display screen 3321 are respectively arranged behind the left lens barrel assembly 321 and the right lens barrel assembly 331, the left lens barrel assembly 321 and the right lens barrel assembly 331 are controlled respectively by the left pupillary distance adjusting mechanism 36 and the right pupillary distance adjusting mechanism 37, to move left and right, in order to realize separate control of the left eye pupillary distance and the right eye pupillary distance, so that users can independently adjust the pupillary distance of left eye or right eye according to their own pupillary distances, and the images seen by both eyes through left lens barrel assembly 321 and right lens barrel assembly 331 are clearer; and it can prevent the optical centers of the left lens barrel assembly 321 and the right lens barrel assembly 331 from changing with respect to the display centers of the left display screen 3221 and the right display screen 3321, respectively, thereby effectively ensuring the display effect of the images in the left lens barrel assembly 321 and the right lens barrel assembly 331.

Embodiment 2

In this embodiment, a head-mounted display apparatus is provided. The head-mounted display apparatus includes an optical module 3 shown in Embodiment 1, and a headband module connected to the optical module 3. Because the left lens barrel assembly 321 and the right lens barrel assembly 331 of the optical module 3 are respectively provided with a left display screen 3221 and a right display screen 3321, and a left sight distance adjusting mechanism 34 and a right sight distance adjusting mechanism 35 are provided to separately adjust the sight distance of the left lens barrel assembly 321 and the right lens barrel assembly 331, so that users can adjust the sight distance of the left lens barrel assembly 321 and the right lens barrel assembly 331 according to the diopter of the left eye and the right eye, so that both eyes can see clearer images, meeting the needs of more users. In addition, because the left display screen 3221 and the right display screen 3321 are respectively arranged behind the left lens barrel assembly 321 and the right lens barrel assembly 331, the left lens barrel assembly 321 and the right lens barrel assembly 331 are controlled respectively by the left pupillary distance adjusting mechanism 36 and the right pupillary distance adjusting mechanism 37, to move left and right, in order to realize separate control of the left eye pupillary distance and the right eye pupillary distance, so that users can independently adjust the pupillary distance of left eye or right eye according to their own pupillary distances, and the images seen by both eyes through left lens barrel assembly 321 and right lens barrel assembly 331 are clearer; and it can prevent the optical centers of the left lens barrel assembly 321 and the right lens barrel assembly 331 from changing with respect to the display centers of the left display screen 3221 and the right display screen 3321, respectively, thereby effectively ensuring the display effect of the images in the left lens barrel assembly 321 and the right lens barrel assembly 331.

The present invention has been described through several specific embodiments, and it shall be understood by those skilled in the art that various changes and equivalent substitutions can be made to the present invention without departing from the scope of the present invention. In addition, various modifications may be made to the present invention according to a specific situation or a particular circumstance without departing from the scope of the present invention. Therefore, the present invention is not limited to the specific embodiments disclosed, but shall include all embodiments falling within the scope of the claims of the present invention.

What is claimed is:

1. An optical module, comprising a module housing, and a left lens barrel mechanism, a right lens barrel mechanism, a left sight distance adjusting mechanism, a right sight distance adjusting mechanism, a left pupillary distance adjusting mechanism and a right pupillary distance adjusting mechanism arranged in the module housing; the left lens barrel mechanism comprises a left lens barrel assembly and a left display screen assembly sleeved behind the left lens barrel assembly, the left display screen assembly includes a left display screen and a left screen bracket for mounting the left display screen; the right lens barrel mechanism comprises a right lens barrel assembly and a right display screen assembly sleeved behind the right lens barrel assembly, the right display screen assembly includes a right display screen and a right screen bracket for mounting the right display screen; the left sight distance adjusting mechanism is arranged inside the module housing and connected with the left display screen assembly, for adjusting the distance between the left display screen and the left lens barrel assembly; the right sight distance adjusting mechanism is arranged inside the module housing and connected with the right display screen assembly, for adjusting the distance between the right display screen and the right lens barrel assembly; the left pupillary distance adjusting mechanism is connected with the left lens barrel mechanism and used for driving the left lens barrel mechanism to move left and right; the right pupillary distance adjusting mechanism is connected with the right lens barrel mechanism and used for driving the right lens barrel mechanism to move left and right;

wherein the left sight distance adjusting mechanism comprises a left adjustment button, a left driven synchronous gear, a first left synchronous screw, a second left synchronous screw, a third left synchronous screw, a left tension wheel, a left synchronous belt and a left sight distance pushing bracket; the left sight distance pushing bracket is connected with the left screen bracket; the left sight distance pushing bracket is arranged on the first left synchronous screw, second left synchronous screw and third left synchronous screw; the left adjustment button, left driven synchronous gear, first left synchronous screw, second left synchronous screw, third left synchronous screw and left tension wheel are matched with left synchronous belt, so that the left sight distance pushing bracket drives the left screen bracket to move back and forth;

the right sight distance adjusting mechanism comprises a right adjustment button, a right driven synchronous gear, a first right synchronous screw, a second right synchronous screw, a third right synchronous screw, a right tension wheel, a right synchronous belt and a right sight distance pushing bracket; the right sight distance pushing bracket is connected with the right screen bracket; the right sight distance pushing bracket is arranged on the first right synchronous screw, second right synchronous screw and third right synchronous screw; the right adjustment button, right driven synchronous gear, first right synchronous screw, second right synchronous screw, third right synchronous screw and right tension wheel are matched with right synchronous belt, so that the right sight distance pushing bracket drives the right screen bracket to move back and forth;

wherein the module housing comprises a module front housing and a module rear housing, the module front housing is provided with a plurality of metal mounting shafts; the left adjustment button, left driven synchronous gear, first left synchronous screw, second left synchronous screw, third left synchronous screw, left tension wheel, left synchronous belt and left sight distance pushing bracket are arranged on the metal mounting shafts; the right adjustment button, right driven synchronous gear, first right synchronous screw, second right synchronous screw, third right synchronous screw, right tension wheel, right synchronous belt and right sight distance pushing bracket are arranged on the metal mounting shafts.

2. The optical module according to claim 1, wherein the left adjustment button comprises a left rotation control part and a left driving gear part which are integrally formed; the first left synchronous screw comprises a first left driven gear part and a first left screw part which are integrally formed; the second left synchronous screw comprises a second left driven gear part and a second left screw part which are integrally formed; the third left synchronous screw comprises a third left driven gear part and a third left screw part which are integrally formed; the left sight distance pushing bracket comprises a left bracket body, and a first left screw hole, a second left screw hole, a third left screw hole and a left bracket connecting part arranged on the left bracket body; the left driving gear part, left tension wheel, left driven synchronous gear, first left driven gear part, second left driven gear part and third left driven gear part are matched with the left synchronous belt to realize synchronous transmission; the first left screw part matches with the first left screw hole, the second left screw part matches with the second left screw hole, and the third left screw part matches with the third left screw hole, so as to move the left bracket body back and forth;

the right adjustment button comprises a right rotation control part and a right driving gear part which are integrally formed; the first right synchronous screw comprises a first right driven gear part and a first right screw part which are integrally formed; the second right synchronous screw comprises a second right driven gear part and a second right screw part which are integrally formed; the third right synchronous screw comprises a third right driven gear part and a third right screw part which are integrally formed; the right sight distance pushing bracket comprises a right bracket body, and a first right screw hole, a second right screw hole, a third right screw hole and a right bracket connecting part arranged on the right bracket body; the right driving gear part, right tension wheel, right driven synchronous gear, first right driven gear part, second right driven gear part and third right driven gear part are matched with the right synchronous belt to realize synchronous transmission; the first right screw part matches with the first right screw hole, the second right screw part matches with the second right screw hole, and the third right screw part matches with the third right screw hole, so as to move the right bracket body back and forth.

3. The optical module according to claim 2, wherein the left sight distance pushing bracket comprises two left bracket connecting parts arranged opposite to each other from top to bottom, and each left bracket connecting part is provided with left plastic bones extending inward; the left screen bracket is provided with two left structural grooves matched with the left plastic bones oppositely in the vertical direction;

the right sight distance pushing bracket comprises two right bracket connecting parts arranged opposite to each other from top to bottom, and each right bracket connecting part is provided with right plastic bones extending inward; the right screen bracket is provided with two right structural grooves matched with the right plastic bones oppositely in the vertical direction.

4. The optical module according to claim 1, wherein the left lens barrel assembly comprises a left lens barrel housing and a left lens assembly disposed in the left lens barrel housing, the left lens barrel housing is provided with at least one left connecting hole; the left screen bracket is provided with at least one left sliding limit groove arranged along the front-back direction; the left lens barrel mechanism further includes a left connecting pin that passes through the left sliding limit groove and is installed on the left connecting hole;

the right lens barrel assembly comprises a right lens barrel housing and a right lens assembly disposed in the right lens barrel housing, the right lens barrel housing is provided with at least one right connecting hole; the right screen bracket is provided with at least one right sliding limit groove arranged along the front-back direction; the right lens barrel mechanism further includes a right connecting pin that passes through the right sliding limit groove and is installed on the right connecting hole.

5. The optical module according to claim 1, wherein the left pupillary distance adjusting mechanism comprises a left pupillary distance guide shaft, a left lens barrel connecting piece, a left pushing piece and a left push button; the left pupillary distance guide shaft is installed on the module housing; the left lens barrel connecting piece is disposed on the left pupillary distance guide shaft and is connected with the left lens barrel assembly; the left pushing piece is disposed on the left pupillary distance guide shaft and drives the left lens barrel connecting piece to move along the left pupillary distance guide shaft; the left push button is disposed on the left pushing piece and used for controlling the left pushing piece to move along the left pupillary distance guide shaft;

the right pupillary distance adjusting mechanism comprises a right pupillary distance guide shaft, a right lens barrel connecting piece, a right pushing piece and a right push button; the right pupillary distance guide shaft is installed on the module housing; the right lens barrel connecting piece is disposed on the right pupillary distance guide shaft and is connected with the right lens barrel assembly; the right pushing piece is disposed on the right pupillary distance guide shaft and drives the right lens barrel connecting piece to move along the right pupillary distance guide shaft; the right push button is disposed on the right pushing piece and used for controlling the right pushing piece to move along the right pupillary distance guide shaft.

6. The optical module according to claim 5, wherein the left lens barrel connecting piece comprises a left lens barrel connecting part and a left guide shaft connecting part which are integrally formed, the left lens barrel connecting part is provided with a left guide through hole for the left lens barrel assembly to pass through, the left guide shaft connecting part is provided with a left guide through hole for the left pupillary distance guide shaft to pass through; the left push button comprises a left pushing part and a left extension convex part which are integrally formed; the left pushing piece is provided with a left slot matched with the left extension convex part and a left pushing insertion hole for the left pupillary distance guide shaft to pass through;

the right lens barrel connecting piece comprises a right lens barrel connecting part and a right guide shaft connecting part which are integrally formed, the right lens barrel connecting part is provided with a right guide through hole for the right lens barrel assembly to pass through, the right guide shaft connecting part is provided with a right guide through hole for the right pupillary distance guide shaft to pass through; the right push button comprises a right pushing part and a right extension convex part which are integrally formed; the right pushing piece is provided with a right slot matched with the right extension convex part and a right pushing insertion hole for the right pupillary distance guide shaft to pass through.

7. The optical module according to claim 6, wherein the left pupillary distance adjusting mechanism further comprises a left push limiting assembly; the left push limiting assembly comprises a left pupillary distance sliding limiting piece disposed inside the module housing, the left pupillary distance sliding limiting piece and the module housing match to form a left sliding space for the left pushing piece to be inserted; the left pupillary distance sliding limiting piece inside the sliding space or one side of the module housing is provided with a left sliding gear rack; the part of the left sliding space where the left pushing piece inserted is provided with a left pushing gear matched with the left sliding gear rack;

the right pupillary distance adjusting mechanism further comprises a right push limiting assembly; the right push limiting assembly comprises a right pupillary distance sliding limiting piece disposed inside the module housing, the right pupillary distance sliding limiting piece and the module housing match to form a right sliding space for the right pushing piece to be inserted; the right pupillary distance sliding limiting piece inside the sliding space or one side of the module housing is provided with a right sliding gear rack; the part of the right sliding space where the right pushing piece inserted is provided with a right pushing gear matched with the right sliding gear rack.

8. A head-mounted display apparatus, comprising the optical module according to claim 1 and a headband module connected to the optical module.

* * * * *